United States Patent
Kuniba

(10) Patent No.: US 8,379,938 B2
(45) Date of Patent: Feb. 19, 2013

(54) GRADATION CORRECTION CHARACTERISTICS EVALUATION DEVICE, IMAGE PROCESSING DEVICE, GRADATION CORRECTION CHARACTERISTICS EVALUATION METHOD, IMAGE PROCESSING METHOD, AND COMPUTER-READABLE COMPUTER PROGRAM PRODUCT

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 1093 days.

(21) Appl. No.: 12/318,136

(22) Filed: Dec. 22, 2008

(65) Prior Publication Data

US 2009/0123067 A1    May 14, 2009

Related U.S. Application Data

(63) Continuation of application No. PCT/JP2007/062318, filed on Jun. 19, 2007.

(30) Foreign Application Priority Data

Jul. 6, 2006   (JP) .................................. 2006-186730

(51) Int. Cl.
*G06K 9/00* (2006.01)
(52) U.S. Cl. ......... 382/118; 382/168; 382/172; 382/274
(58) Field of Classification Search ......................... None
See application file for complete search history.

(56) References Cited

U.S. PATENT DOCUMENTS

| | | | |
|---|---|---|---|
| 5,923,383 A | 7/1999 | Kim | |
| 6,819,794 B2 | 11/2004 | Inoue | |
| 7,068,328 B1 * | 6/2006 | Mino | 348/672 |
| 7,580,566 B2 * | 8/2009 | Fukuda et al. | 382/168 |
| 2006/0023273 A1 * | 2/2006 | Kato | 358/519 |
| 2006/0262354 A1 | 11/2006 | Kuwata et al. | |

FOREIGN PATENT DOCUMENTS

| | | |
|---|---|---|
| JP | A-06-178113 | 6/1994 |
| JP | A-10-191059 | 7/1998 |
| JP | A-11-008768 | 1/1999 |
| JP | A-11-196275 | 7/1999 |
| JP | A-2001-243464 | 9/2001 |
| JP | A-2003-060980 | 2/2003 |
| JP | A-2004-177988 | 6/2004 |

OTHER PUBLICATIONS

Japanese Office Action issued in Japanese Application No. 2008-523641, dated Apr. 19, 2011 (with Translation).

\* cited by examiner

*Primary Examiner* — Brian P Werner
(74) *Attorney, Agent, or Firm* — Oliff & Berridge, PLC

(57) ABSTRACT

A gradation correction characteristics evaluation device includes: a histogram creation unit that creates a histogram based upon pixel values indicated at pixels constituting an input image; and an evaluation unit that evaluates gradation correction characteristics, which is used to correct gradation of the image, based upon the histogram of the image having been created by the histogram creation unit and the gradation correction characteristics.

14 Claims, 8 Drawing Sheets

GRADATION CORRECTION CHARACTERISTICS EVALUATION DEVICE, IMAGE PROCESSING DEVICE, GRADATION CORRECTION CHARACTERISTICS EVALUATION METHOD, IMAGE PROCESSING METHOD, AND COMPUTER-READABLE COMPUTER PROGRAM PRODUCT

This application is a continuation of International Application No. PCT/JP2007/062318 filed Jun. 19, 2007.

INCORPORATION BY REFERENCE

The disclosures of the following priority application and the International Application are herein incorporated by reference: Japanese Patent Application No. 2006-186730 filed Jul. 6, 2006; and International Application No. PCT/JP2007/062318 filed Jun. 19, 2007.

BACKGROUND OF THE INVENTION

1. Field of the Invention

The present invention relates to a gradation correction characteristics evaluation device engaged in evaluation of a method adopted when correcting the gradation of an image, an image processing apparatus engaged in image processing, a gradation correction characteristics evaluation method, an image processing method, a gradation correction characteristics evaluation program and an image processing program.

2. Description of Related Art

The brightness and the contrast of an image may be improved through histogram equalization. For instance, U.S. Pat. No. 5,923,383 discloses a technology whereby a histogram is calculated for the gray levels of the image, the frequency values in the histogram are equalized so as not to deviate beyond a predetermined range and image gradation correction characteristics are calculated based upon the equalized histogram.

SUMMARY OF THE INVENTION

Although the brightness or the contrast of the image cannot always be optimized based upon the gradation correction characteristics calculated through histogram equalization in the related art, the gradation correction characteristics cannot be judged in advance as to whether or not they would assure the best possible improvement.

According to the 1st aspect of the present invention, a gradation correction characteristics evaluation device comprises: a histogram creation unit that creates a histogram based upon pixel values indicated at pixels constituting an input image; and an evaluation unit that evaluates gradation correction characteristics, which is used to correct gradation of the image, based upon the histogram of the image having been created by the histogram creation unit and the gradation correction characteristics.

According to the 2nd aspect of the present invention, in the gradation correction characteristics evaluation device according to the 1st aspect, it is preferred that the evaluation unit individually evaluates a plurality of sets of gradation correction characteristics different from one another.

According to the 3rd aspect of the present invention, in the gradation correction characteristics evaluation device according to the 1st aspect, it is preferred that: the histogram creation unit creates a normalized histogram normalized by applying a predetermined weighting coefficient to the histogram created based upon the pixel values indicated at the pixels constituting the image; and the evaluation unit evaluates the gradation correction characteristics based upon the normalized histogram and the gradation correction characteristics.

According to the 4th aspect of the present invention, in the gradation correction characteristics evaluation device according to the 1st aspect, it is preferred that: the gradation correction characteristics evaluation device further comprises a dividing unit that divides the image into a plurality of areas; the histogram creation unit creates a histogram based upon pixel values indicated at pixels constituting an image in each area; and the evaluation unit evaluates gradation correction characteristics for each area based upon the histogram of the image in the area and the gradation correction characteristics that is used to correct gradation of the image in the area.

According to the 5th aspect of the present invention, in the gradation correction characteristics evaluation device according to the 1st aspect, it is preferred that: the gradation correction characteristics evaluation device further comprises a face area detection unit that detects an area that is occupied by a person's face in the image; and the histogram creation unit creates the histogram of the image by increasing weighting applied to the area occupied by the person's face detected via the face area detection unit.

According to the 6th aspect of the present invention, in the gradation correction characteristics evaluation device according to the 1st aspect, it is preferred that the evaluation unit evaluates the gradation correction characteristics based upon a ratio of a change in output characteristics to a change in individual gradation levels observed in the gradation correction characteristics and frequency values corresponding to the individual gradation levels in the histogram.

According to the 7th aspect of the present invention, an image processing device comprises: a gradation correction characteristics evaluation device according to the 1st aspect; and a processing unit that executes gradation correction by using the gradation correction characteristics selected based upon evaluation results provided by the evaluation unit.

According to the 8th aspect of the present invention, a gradation correction characteristics evaluation method comprises: a histogram creation step in which a histogram is created based upon pixel values indicated at pixels constituting an input image; and an evaluation step in which gradation correction characteristics that is used to correct gradation of the image are evaluated based upon the histogram of the image created in the histogram creation step and the gradation correction characteristics.

According to the 9th aspect of the present invention, in the gradation correction characteristics evaluation method according to the 8th aspect, it is preferred that a plurality of sets of gradation correction characteristics different from one another are individually evaluated in the evaluation step.

According to the 10th aspect of the present invention, in the gradation correction characteristics evaluation method according to the 8th aspect, it is preferred that a normalized histogram is created in the histogram creation step by applying a predetermined weighting coefficient to the histogram having been created based upon the pixel values indicated at the pixels constituting the image; and the gradation correction characteristics are evaluated in the evaluation step based upon the normalized histogram and the gradation correction characteristics.

According to the 11th aspect of the present invention, in the gradation correction characteristics evaluation method according to the 8th aspect, it is preferred that: the gradation correction characteristics evaluation method further comprises a dividing step in which the image is divided into a plurality of areas; a histogram for each area is created in the histogram creation step based upon pixel values indicated at pixels constituting an image in the area; gradation correction characteristics are obtained in correspondence to the image in each area in a gradation correction characteristics acquisition step; and the gradation correction characteristics for each area are evaluated based upon the histogram of the image in the area and the gradation correction characteristics that is used to correct gradation in the image in the area.

According to the 12th aspect of the present invention, in the gradation correction characteristics evaluation method according to the 8th aspect, it is preferred that: the gradation correction characteristics evaluation method further comprises a face area detection step in which an area occupied by a person's face in the image is detected; and the histogram of the image is created in the histogram creation step by increasing weighting applied to the area occupied by the person's face detected through the face area detection step.

According to the 13th aspect of the present invention, in the gradation correction characteristics evaluation method according to the 8th aspect, it is preferred that the gradation correction characteristics are evaluated in the evaluation step based upon a ratio of a change in output characteristics to a change in individual gradation levels observed in the gradation correction characteristics and frequency values of the individual gradation levels indicated in the histogram.

According to the 14th aspect of the present invention, an image processing method comprises: steps of a gradation correction characteristics evaluation method according to the 8; and a processing step in which gradation correction is executed by using the gradation correction characteristics selected based upon evaluation results obtained through the evaluation step.

According to the 15th aspect of the present invention, a computer-readable computer program product contains a gradation correction characteristics evaluation program that comprises instructions to execute steps of a gradation correction characteristics evaluation method according to the 8th aspect.

According to the 16th aspect of the present invention, a computer-readable computer program product contains an image processing program that comprises instructions to execute steps of an image processing method according to the 14.

BRIEF DESCRIPTION OF THE DRAWINGS

FIG. 8 shows an illustration showing how a program may be provided in a recording medium such as a CD-ROM or through a data signal on the Internet or the like.

DESCRIPTION OF PREFERRED EMBODIMENTS

Figure 1:
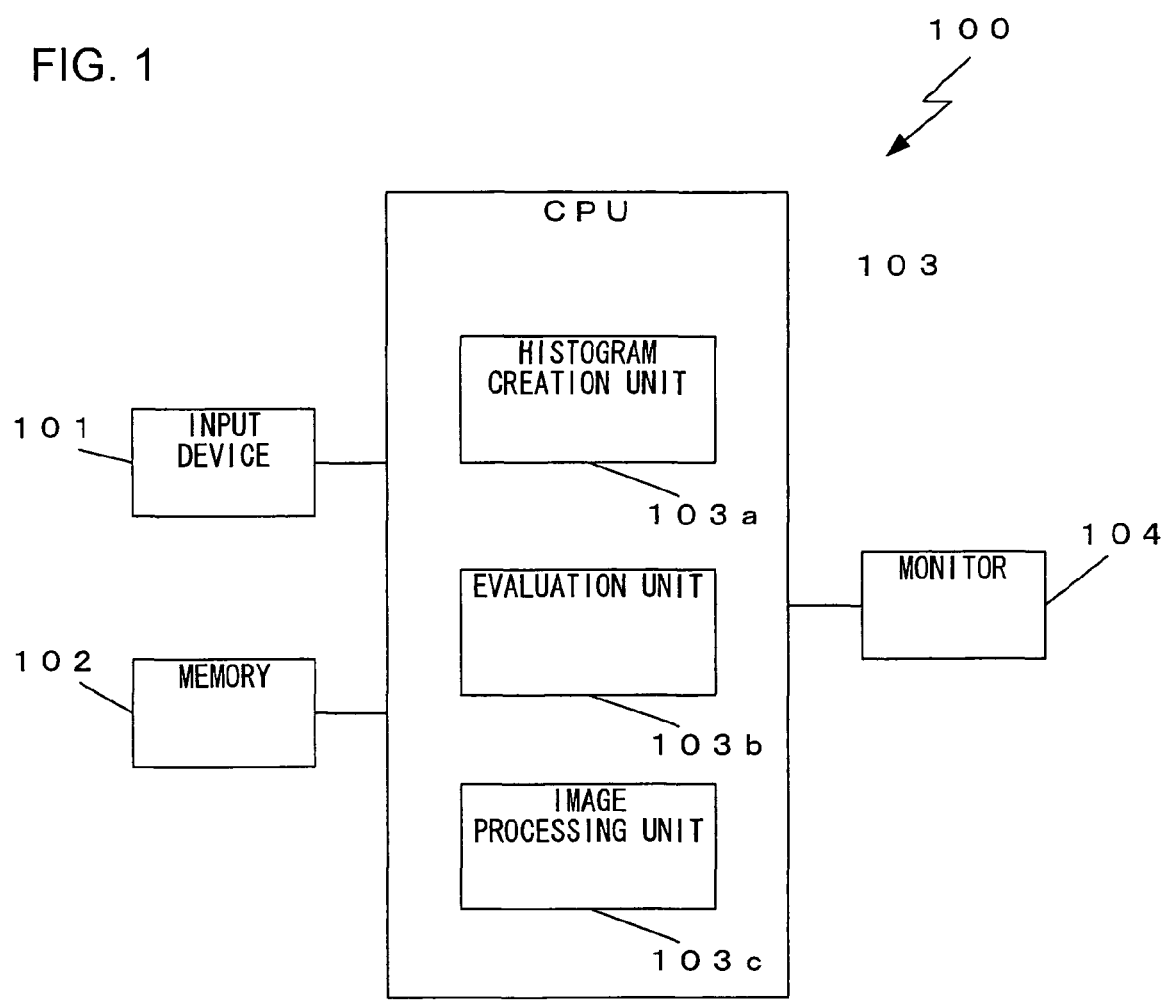
FIG. 1 shows a block diagram of the structure adopted in the image processing apparatus achieved in an embodiment.

FIG. 1 is a block diagram of the structure adopted in the image processing apparatus achieved in an embodiment. An image processing apparatus 100 includes an input device 101, a memory 102, a CPU 103 and a monitor 104. The image processing apparatus 100 may be constituted with a computer system such as a personal computer.

The input device 101, which is operated by the user, may be, for instance, a mouse, a keyboard or an input switch. In the memory 102, image data to undergo image processing and an image processing program are stored. The image data recorded in the memory 102 may have been obtained by reading image data of an image captured with, for instance, a digital camera.

The CPU 103, constituted with various peripheral circuits, includes a histogram creation unit 103a that creates a histogram indicating the frequency levels respectively corresponding to specific brightness levels assumed at pixels constituting an image, an evaluation unit 103b that evaluates gradation correction characteristics to be used based upon a histogram of an image having undergone gradation correction based upon the gradation correction characteristics to be used and an image processing unit 103c that executes gradation correction processing on the image. While an image processing target image selected by the user is on display at the monitor 104, the CPU 103 reads the image processing target image stored in the memory 102 in response to an image processing start instruction issued as the user operates the input device 101. The CPU also reads and executes the image processing program stored in the memory 102 so as to execute the gradation correction processing to be detailed later on the image processing target image.

The CPU 103 first sets up a plurality of sets of gradation correction characteristics that may be used when correcting the gradation of the image processing target image, engages the histogram creation unit 103a to create a pre-gradation correction histogram and a post-gradation correction histogram and engages the evaluation unit 103b in calculation of evaluation values to be used to evaluate the plurality of sets of gradation correction characteristics. Then, the plurality of sets of gradation correction characteristics having been set are evaluated based upon the evaluation values and a single set of gradation correction characteristics to be used in conjunction with the target image is selected from the plurality of sets of gradation correction characteristics. The CPU 103 may set a plurality of sets of gradation correction characteristics obtained based upon the image by adopting a plurality of different methods or the CPU may set a plurality of sets of gradation correction characteristics read from the memory 102 where they are recorded in advance.

The optimal gradation correction characteristics are selected in the embodiment from gradation correction characteristics A calculated based upon the image through a histogram flattening method adopted in gradation correction in the known art and gradation correction characteristics B recorded in the memory 102 in advance. These gradation correction characteristics are evaluated by using the evaluation values detailed later in the embodiment. In the first gradation correction method, a cumulative histogram H(v) of the image, expressed as in (1), is utilized. Namely, the CPU 103 calculates the cumulative histogram H(v) as expressed in (1) below based upon a histogram h(v) of the image created via the histogram creation unit 103a and designates gradation correction characteristics that will modify the histogram h(v)

of the image to the cumulative histogram H(v) as the gradation correction characteristics A.

$$H(v) = \int_0^v h(v')dv' \qquad (1)$$

Figure 2:
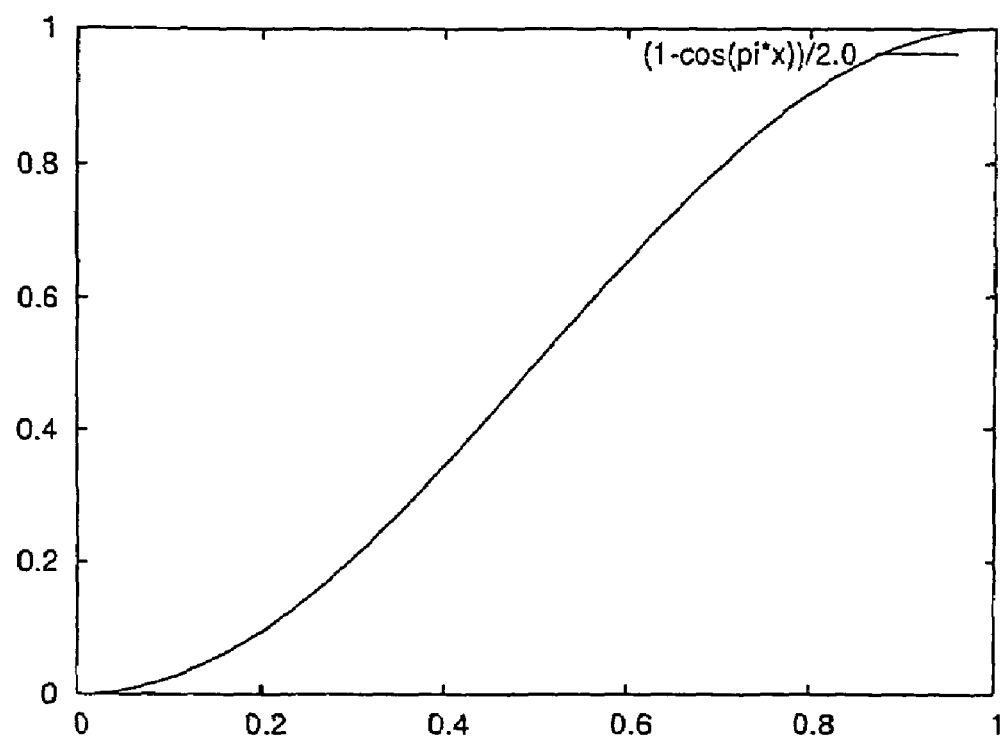
FIG. 2 shows a specific example of the gradation correction characteristics A.

The gradation correction characteristics A is represented by a curve such as that in FIG. 2 and through gradation correction processing executed by applying these gradation correction characteristics A in conjunction with the image, a flattened post-gradation correction histogram is obtained. As a result, the ratio of the change in the gradation corresponding to brightness values with high histogram frequency values is increased, which, in turn, raises the contrast and ultimately improves the image quality.

Gradation correction characteristics $H_2(v)$ expressed in (2) below are set as the gradation correction characteristics B prerecorded in the memory 102. The gradation correction characteristics B are calculated through a method other than the histogram flattening method and recorded in advance in the memory 102.

$$H_2(v) = \int_0^v 2(1-\cos^2(\pi v))dv \qquad (2)$$

In the related art, the optimal set of gradation correction characteristics for gradation correction processing is selected from a plurality of sets of gradation correction characteristics and an image having undergone the gradation correction processing best suited for the target image is obtained, as the best image output is selected by the user from a plurality of post-gradation correction images obtained by actually applying the plurality of sets of gradation correction characteristics to the target image. However, different image outputs may be selected by different individuals with varying levels of expertise and experience and the length of time required for the selection process may vary among individual users, giving rise to inefficiency in the processing. Accordingly, the gradation correction characteristics that will achieve the highest level of improvement in image quality are selected in advance based upon evaluation values m and the gradation correction processing is executed on the image by using the selected gradation correction characteristics so as to ensure that the optimal gradation correction processing is executed with a high level of efficiency on the image processing target image in the embodiment.

The evaluation method adopted in the embodiment is described next. In reference to the embodiment, a method for calculating a gradation correction characteristics evaluation value m that will take a higher value when hypotheses 1 and 2, set as requirements for gradation correction characteristics with a high image quality improvement rate (desirable gradation correction characteristics) based upon the standard characteristics of images that look good to the human eye, are satisfied to a greater extent, is described.
(Hypothesis 1)

Better gradation correction characteristics assure higher contrast in the corrected image.
(Hypothesis 2)

A dark image area is brightened to a greater extent based upon better gradation correction characteristics.

First, an evaluation value $m_0$ that satisfies hypothesis 1 alone is examined. The slope of gradation correction characteristics f(v) is expressed as df/dv and, accordingly, the evaluation value $m_0$ can be expressed as in (3) below with h(v) representing the histogram of the brightness v ($0 \leq v \leq 1$) of the image processing target image.

$$m_0 = \int_0^1 h(v)\frac{df(v)}{dv}dv \qquad (3)$$

Expression (3) indicates that a greater evaluation value $m_0$ can be obtained by selecting gradation correction characteristics f(v) that will raise the contrast specifically over image areas with high frequency values in the image histogram h(v). In other words, the requirement of hypothesis 1 is well reflected in the evaluation value $m_0$ calculated as expressed in expression (3).

Then, hypothesis 2 is also taken into consideration, and a normalized histogram h'(v), normalized by weighting image areas with low brightness levels in the histogram h(v), is calculated. The low brightness areas are weighted as expressed in (4) below by using a weighting coefficient w(v) assuming characteristics represented by a curve such as that in FIG. 3.

$$h'(v) = \frac{h(v)w(v)}{\int h(v)w(v)dv} \qquad (4)$$

Figure 3:
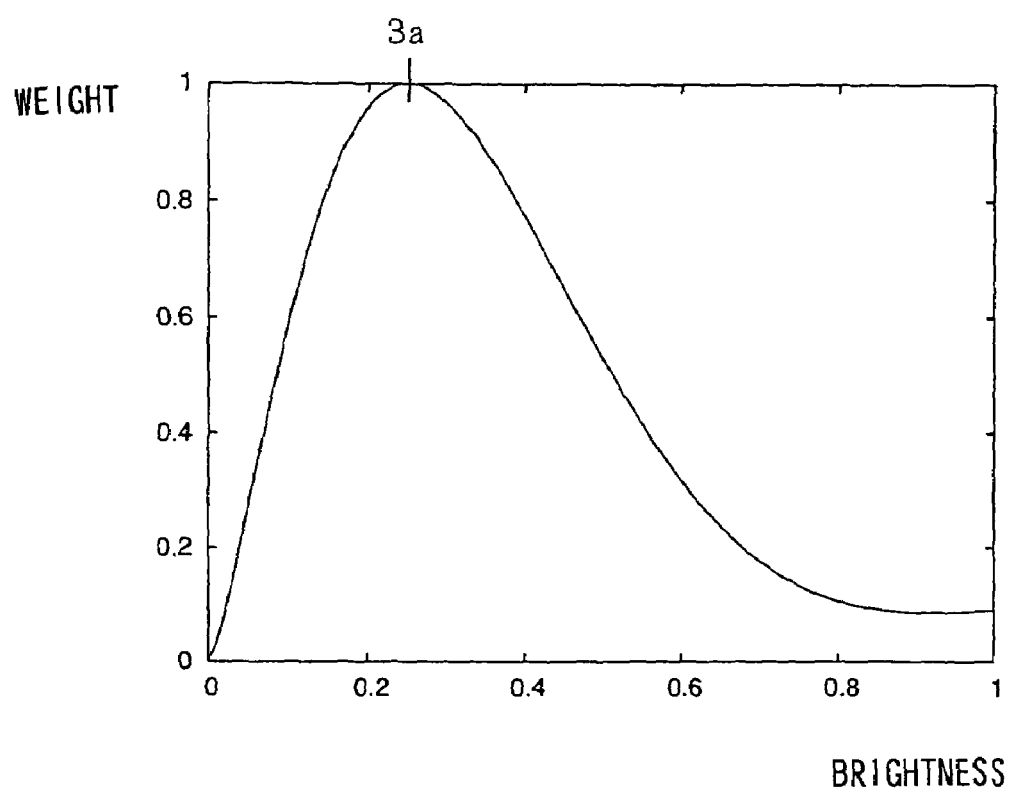
FIG. 3 shows the characteristics of the weighting coefficient w(v).

It is to be noted that the weighting coefficient is set to assume the value of 0 when the brightness level is 0 and that the weighting increases until it peaks at 3a, as shown in FIG. 3. The weighting peak 3a is set in a low brightness range, e.g., at a brightness level equal to or greater than 0 and equal to or less than 0.5. Beyond the weighting peak 3a, the weighting decreases as the brightness level increases, but the weighting sustains a substantially constant value at brightness levels equal to and greater than a predetermined value so as to ensure that the weighting coefficient does not assume the value of 0 in the high brightness range.

Figure 4:
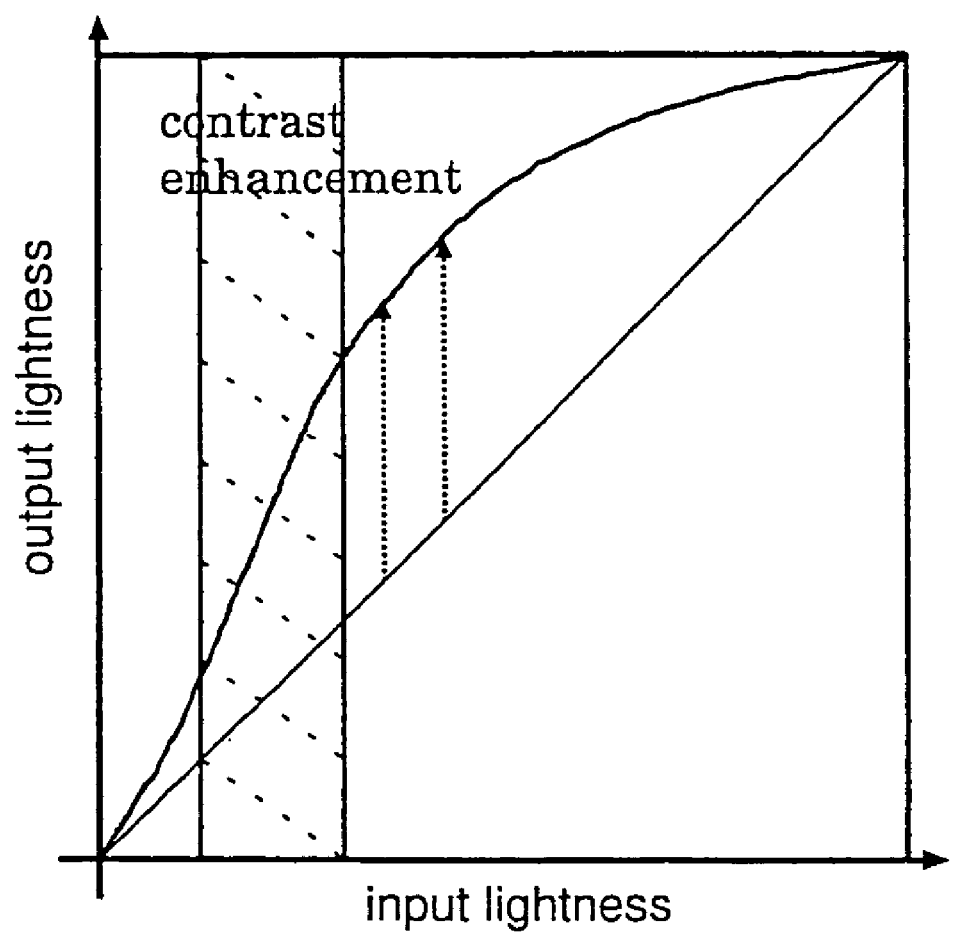
FIG. 4 shows a specific example of a histogram h(v) normalized based upon weighting characteristics.

As the histogram h(v) is normalized based upon the weighting characteristics set by taking into consideration the contrast of brightness as a crucial factor as described above, a normalized histogram h'(v) satisfying hypothesis 2, such as that shown in FIG. 4 with dark image areas weighted, is obtained. Then, an evaluation value m satisfying both hypothesis 1 and hypothesis 2 can be calculated as expressed in (5) below based upon the normalized histogram h'(v) calculated as described above and the gradation correction characteristics f(v).

$$m = \int_0^1 h'(v)\frac{df(v)}{dv}dv \qquad (5)$$

As described earlier, the evaluation value m calculated as expressed in (5) assumes a greater value to indicate more desirable gradation characteristics. The logical basis substantiating this theory is now explained in reference to expression (6) obtained by modifying expression (5).

$$m = [h'(v)f(v)]_0^1 - \int_0^1 \frac{dh'(v)}{dv}f(v)dv \qquad (6)$$

$$= h'(1)f(1) - h'(0)f(0) - \int_0^1 \frac{dh'(v)}{dv} f(v) dv$$

Figure 5:
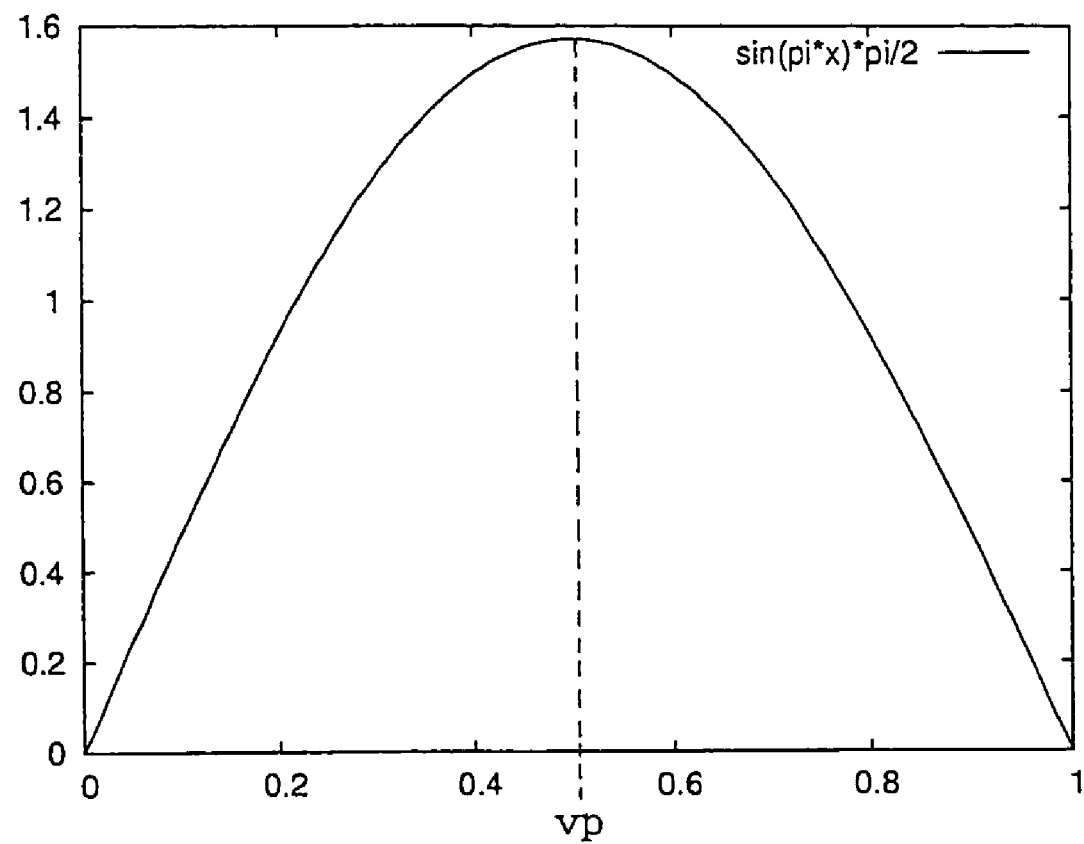
FIG. 5 shows a specific example of a normalized histogram h'(v).

For purposes of simplification, it is assumed in the description that h'(0)=h'(1)=0 in the normalized histogram h'(v) assuming a single peak, as shown in FIG. 5.

With $v_p$ representing the brightness at the peak in the normalized histogram h'(v) in FIG. 5 and $m_+$ and $m_-$ respectively defined as expressed in (7) and (8) below, expression (6) can be rewritten into expression (9).

$$m_+ \equiv \int_{v_p}^1 \left(-\frac{dh'}{dv}\right) f(v) dv \quad (7)$$

$$m_- \equiv \int_0^{v_p} \left(\frac{dh'}{dv}\right) f(v) dv \quad (8)$$

$$m = \int_{v_p}^1 \left(-\frac{dh'}{dv}\right) f(v) dv + \int_0^{v_p} \left(-\frac{dh'}{dv}\right) f(v) dv \quad (9)$$

$$\equiv m_+ - m_-$$

Figure 6:
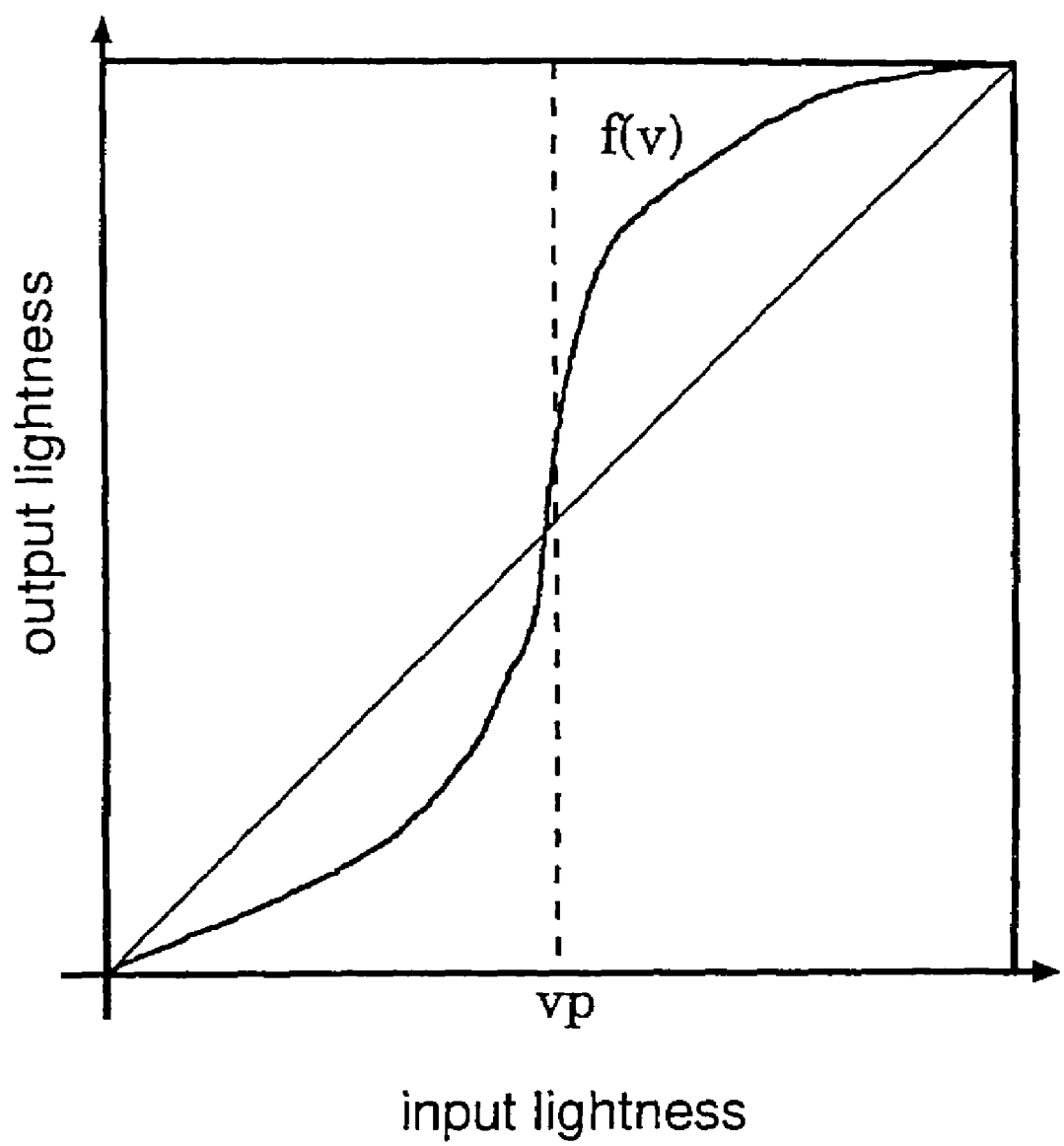
FIG. 6 shows a specific example of gradation correction characteristics that will provide the maximum evaluation value m.

Expression (9) indicates that m-must be decreased and $m_+$ must be increased in order to maximize the value of m. In other words, the value of m can be maximized by using gradation correction characteristics whereby f(v) decreases ($m_-$ decreases) over the brightness range lower than $v_p$ and f(v) increases ($m_+$ increases) over the brightness range above $v_p$, as shown in FIG. 6. Namely, the evaluation value m calculated in correspondence to gradation correction characteristics assuming a greater slope in the curve near $v_p$ so as to achieve higher contrast assumes a greater value. From this perspective, the evaluation value m may be regarded as a value used to alter the image contrast through gradation correction.

As described above, the gradation correction characteristics can be evaluated with ease based upon the evaluation value m simply by using the gradation correction characteristics f(v) and the normalized histogram h'(v) corresponding to the image. This means that the contrast correction and the brightness correction to be achieved through the gradation correction can be evaluated with ease. Accordingly, a histogram with regard to the brightness of the image to undergo the gradation correction is created at the histogram creation unit 103a and the evaluation unit 103b calculates the evaluation value m as expressed in (5) or (9) based upon the histogram having been created and gradation correction characteristics data in the embodiment of the present invention.

Next, the CPU 103 evaluates the gradation correction characteristics A and the gradation correction characteristics B based upon evaluation values m having been calculated as described above and determines which set of gradation correction characteristics should be used in the gradation correction processing on the image. First, the CPU 103 calculates as expressed in (10) below an evaluation value $m_h$ for the gradation characteristics A indicated in expression (1).

$$m_h = \int_0^1 h'(v) \frac{dH}{dv} dv \quad (10)$$

$$= \int_0^1 h'(v) \left(\frac{d}{dv} \int_0^v h(x) dx dv\right)$$

$$= \int_0^1 h'(v) h(v) dv$$

$$= \int_0^1 \frac{w(v)}{k} h^2(v)$$

(k represents a normalizing constant)

Assuming that h(v)=(π/2) sin(πv) is true with regard to the histogram h(v) of the image processing target image, the evaluation value $m_h$ for the gradation correction characteristics A can be calculated as expressed in (11) below.

$$m_h = \int_0^1 \frac{w(v)}{k} \left(\frac{\pi}{2} \sin(\pi)\right)^2 dv \cong 1.272 \quad (11)$$

Likewise, an evaluation value $m'_h$ for the gradation correction characteristics B can be calculated as expressed in (12) below.

$$m'_h = \int_0^1 \frac{w(v)}{k} \frac{\pi}{2} \sin(\pi v) \cdot 2(1 - \cos^2(\pi v)) dv \cong 1.387 \quad (12)$$

In the embodiment, evaluation results represented by $m_h$ and $m'_h$ individually calculated as described above are obtained. The CPU 103 compares $m_h$ with $m'_h$ and determines the gradation correction characteristics represented by a greater value as the gradation correction characteristics to be used in the gradation correction processing. Namely, since $m_h < m'_h$, the gradation correction characteristics B are selected as the gradation correction characteristics to be used in the gradation correction processing in the example described above.

The CPU 103 also makes a decision as to whether or not the evaluation value corresponding to the selected gradation correction characteristics B is greater than 1. If the evaluation value is judged to be greater than 1, the CPU 103 decides that the image quality can be improved by executing the gradation correction processing on the image based upon the gradation correction characteristics B, and accordingly, it executes the gradation correction processing on the image by using the gradation correction characteristics B. The image is then output to the memory 102 for storage. If, on the other hand, the evaluation value is judged to be equal to or less than 1, the CPU decides that if gradation correction processing were to be executed on the image by using the gradation correction characteristics B, the image quality would become poorer. Accordingly, it outputs the image to the memory 102 for storage without executing the gradation correction processing.

Through the procedural sequence described above, the gradation correction characteristics with which the optimal image that will look best to the human eye, among a plurality of sets of gradation correction characteristics having been obtained through different methods and having been set, can be determined (selected) based upon the evaluation values m and the gradation correction processing can be executed by using the gradation correction characteristics with which the image quality can be improved by the greatest extent.

Figure 7:
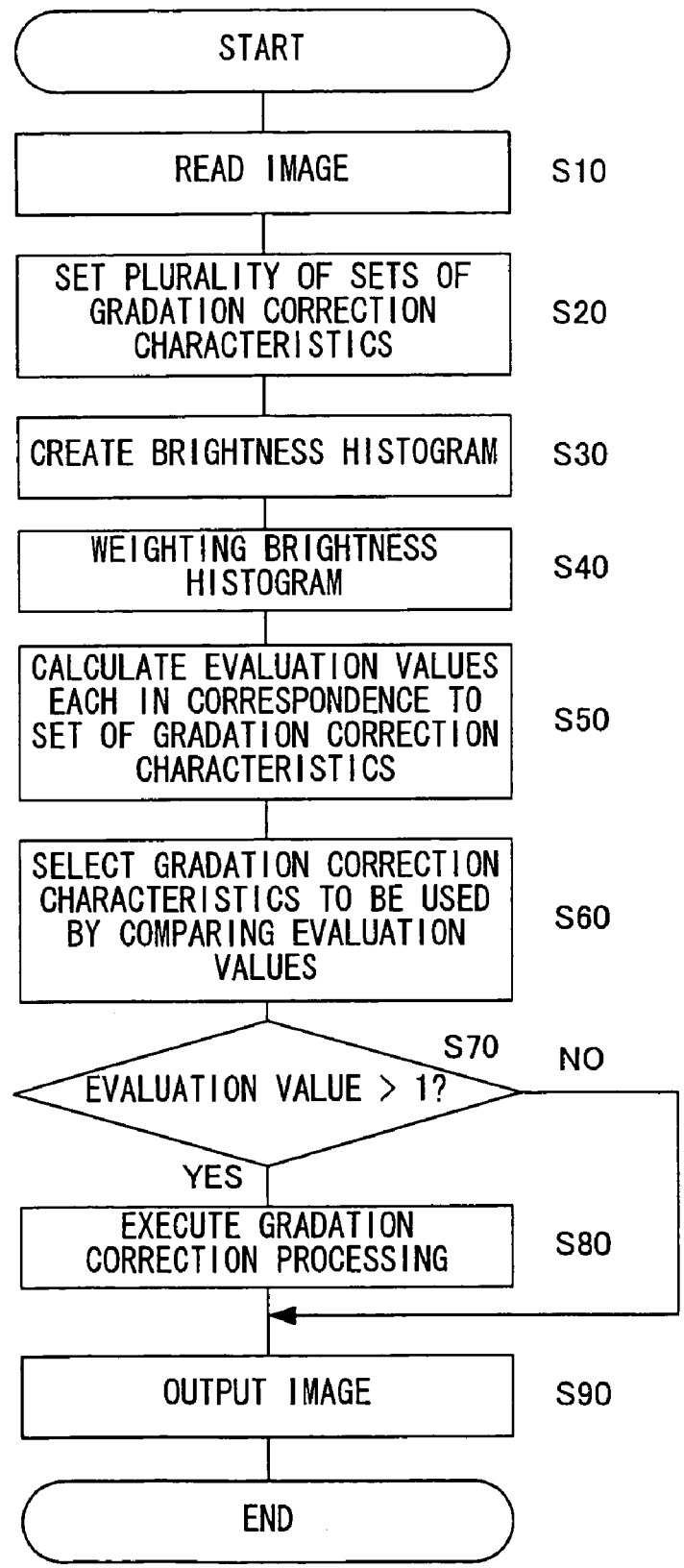
FIG. 7 shows a flowchart of the processing executed at the image processing apparatus.

FIG. 7 presents a flowchart of the processing executed in the image processing apparatus in the embodiment. The processing in FIG. 7 is executed by the CPU 103 based upon a program started up in response to an image processing start instruction issued as the operator operates the input device 101.

In step S10, the image processing target image stored in the memory 102 is read out and then the operation proceeds to step S20. In step S20, a plurality of sets of gradation correction characteristics, e.g. the two sets of gradation correction characteristics A and B described earlier, are set. Subsequently, the operation proceeds to step S30 in which the histogram creation unit 103a in the CPU 103 creates the histogram h(v) of the brightness v in correspondence to the image processing target image and then the operation proceeds to step S40.

In step S40, the brightness histogram h(v) having been created by the histogram creation unit 103a is normalized by weighting low brightness areas with the weighting coefficient w(v), as explained earlier, thereby creating a normalized histogram h'(v). Subsequently, the operation proceeds to step S50, in which the evaluation unit 103b calculates evaluation values m each in correspondence to one of the plurality of sets of gradation correction characteristics, based upon the normalized histogram h'(v) and the corresponding set of gradation correction characteristics, as expressed in (11) and (12). The operation then proceeds to step S60.

In step S60, the plurality of evaluation values having been calculated are compared and the gradation correction characteristics in correspondence to which the largest evaluation value has been calculated are selected as the gradation correction characteristics to be used in the gradation correction processing on the image. The operation then proceeds to step S70 to make a decision as to whether or not the evaluation value having been calculated based upon the selected gradation correction characteristics is greater than 1.

If it is decided that the evaluation value is greater than 1, the operation proceeds to step S80 to execute the gradation correction processing on the image by using the selected gradation correction characteristics, before the operation proceeds to step S90. If, on the other hand, the evaluation value is judged to be equal to or less than 1, the operation proceeds to step S90 without executing the gradation correction processing on the image. In step S90, the image is output to the memory 102 for storage and then the processing ends.

Figure 8:
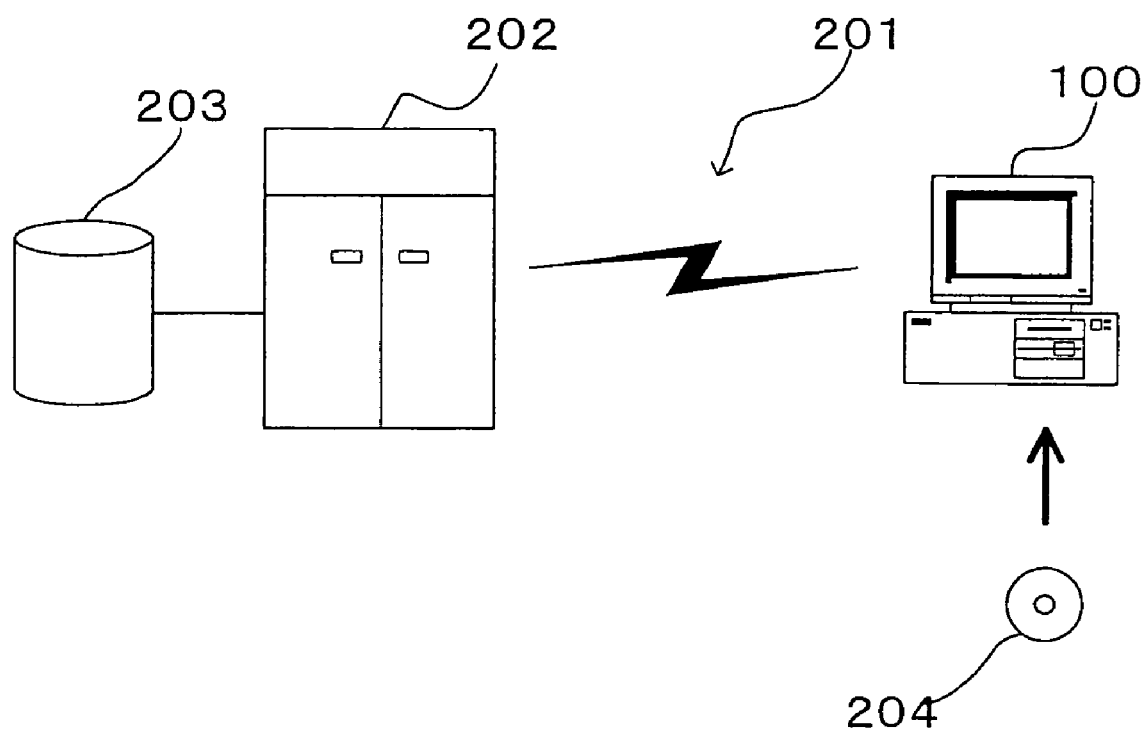

The program described above may be provided in a recording medium such as a CD-ROM or via a data signal exchanged on the Internet or the like. FIG. 8 illustrates how the program may be provided through such media. The image processing apparatus 100 constituted with a personal computer receives the program via a CD-ROM 204. The image processing apparatus 100 also has a connection capability to connect with a communication line 201. A computer 202 is a server computer that provides the program stored in a recording medium such as a hard disk 203. The communication line 201 may be a communication network such as the Internet or it may be a dedicated communication network. The computer 202 reads out the program from the hard disk 203 and transmits the program thus read out to the image processing apparatus 100 via the communication line 201. Namely, the program may be embodied as a data signal on a carrier wave and transmitted via the communication line 201. In short, the program can be distributed as a computer-readable computer program product assuming any of various modes such as a recording medium and a carrier wave.

The following advantages are achieved through the embodiment described above.

(1) Each set of gradation correction characteristics is evaluated based upon the histogram created for the image and the gradation correction characteristics and a decision is made as to whether or not gradation correction is to be executed by using the particular gradation correction characteristics based upon the evaluation results. Thus, the optimal gradation correction characteristics best suited for the target image can be selected before actually executing the gradation correction processing on the image.

(2) Gradation correction characteristics calculated based upon the target image and gradation correction characteristics preselected and recorded in advance are evaluated. Thus, the optimal gradation correction characteristics among the various types of evaluation target gradation correction characteristics, can be selected.

(3) A plurality of sets of gradation correction characteristics calculated through a plurality of different methods are then individually evaluated. As a result, the gradation correction characteristics having been obtained through the various methods can be evaluated accurately regardless of the particulars of the individual gradation correction characteristics calculation methods.

(4) The evaluation value is calculated for each set of gradation correction characteristics by integrating the value representing the product of the ratio of the change in the output characteristics to the change in the individual gradation levels observed in the particular set of gradation correction characteristics (the slope of the gradation correction characteristics) and the frequency values each corresponding to a specific gradation in the histogram. Thus, the evaluation value for each set of gradation correction characteristics can be obtained through simple calculation.

(5) A normalized histogram is calculated by weighting low brightness are as indicated in the image histogram and the gradation correction characteristics are evaluated based upon the normalized histogram and the gradation correction characteristics. As a result, evaluation is executed in such a manner that a set of gradation correction characteristics satisfying the hypothesis "a dark image area is brightened to a greater extent based upon better gradation correction characteristics" are more readily selected, assuring evaluation results better matching human visual perception. In addition, the user is not required to make any judgment based upon the evaluation values, but rather, the image processing apparatus is able to automatically select the optimal gradation correction method, eliminating any dependency on the skill level of the user and any situation in which the user may not know how to proceed.

—Variations—

It is to be noted that the image processing apparatus achieved in the embodiment described above allows for the following variations.

(1) In the embodiment, the histogram h(v) of the brightness of the image is created and evaluation values for gradation correction characteristics are calculated based upon the histogram h(v). However, better gradation correction results are normally achieved through gradation correction executed by focusing on a specific subject within the image and, for this reason, the histogram may be created by concentrating on the subject within the image. For instance, if the image processing target image contains a person, an area constituted with pixels indicating skin color within the image may be judged to be the person's face area and a histogram may be created by weighting these pixels indicating skin color to a greater extent. Alternatively, face detection processing of the known art may be executed on the image so as to determine an image area (face area) occupied by the person's face within the image and a histogram may be created by weighting the pixels within the face area. Through these measures, the gradation correction characteristics can be evaluated with an even higher level of accuracy by applying greater weighting to the subject present within the image.

(2) In the embodiment described above, the gradation correction characteristics to be used in gradation correction processing executed with a single set of gradation correction characteristics used in conjunction with the entire image processing target image, are selected based upon evaluation values calculated for gradation correction characteristics. Instead, as disclosed in Japanese Re-published Patent Publication No. 02/062055, the target image may be divided into a plurality of areas and gradation correction processing may be executed with different sets of gradation correction characteristics each set in correspondence to one of the split areas by calculating evaluation values in correspondence to individual regions to each of which substantially uniform gradation correction characteristics are considered to be applicable and calculating the average value of the evaluation values for the entire image. In other words, the present invention may be adopted in the area adaptive gradation correction as well.

(3) While a brightness histogram is created in the embodiment described above, a histogram may instead be created based upon another type of value indicating brightness levels at the individual pixels in the image data. For instance, a histogram created based upon the pixel values may be created instead.

The above described embodiments are examples, and various modifications can be made without departing from the scope of the invention.

What is claimed is:

1. A gradation correction characteristics evaluation device, comprising:
   a histogram creation unit that creates a histogram based upon pixel values indicated at pixels constituting an input image; and
   an evaluation unit that evaluates gradation correction characteristics, which is used to correct gradation of the image, based upon the histogram of the image having been created by the histogram creation unit and the gradation correction characteristics;
   wherein the evaluation unit evaluates the gradation correction characteristics based upon a ratio of a change in output characteristics to a change in individual gradation levels observed in the gradation correction characteristics and frequency values corresponding to the individual gradation levels in the histogram.

2. A gradation correction characteristics evaluation device according to claim 1, wherein:
   the evaluation unit individually evaluates a plurality of sets of gradation correction characteristics different from one another.

3. A gradation correction characteristics evaluation device according to claim 1, wherein:
   the histogram creation unit creates a normalized histogram normalized by applying a predetermined weighting coefficient to the histogram created based upon the pixel values indicated at the pixels constituting the image; and
   the evaluation unit evaluates the gradation correction characteristics based upon the normalized histogram and the gradation correction characteristics.

4. A gradation correction characteristics evaluation device according to claim 1, further comprising:
   a dividing unit that divides the image into a plurality of areas, wherein:
   the histogram creation unit creates a histogram based upon pixel values indicated at pixels constituting an image in each area; and
   the evaluation unit evaluates gradation correction characteristics for each area based upon the histogram of the image in the area and the gradation correction characteristics that is used to correct gradation of the image in the area.

5. A gradation correction characteristics evaluation device according to claim 1, further comprising:
   a face area detection unit that detects an area that is occupied by a person's face in the image, wherein:
   the histogram creation unit creates the histogram of the image by increasing weighting applied to the area occupied by the person's face detected via the face area detection unit.

6. An image processing device, comprising:
   a gradation correction characteristics evaluation device according to claim 1;
   a processing unit that executes gradation correction by using the gradation correction characteristics selected based upon evaluation results provided by the evaluation unit.

7. A gradation correction characteristics evaluation method, comprising:
   a histogram creation step in which a histogram is created based upon pixel values indicated at pixels constituting an input image; and
   an evaluation step in which gradation correction characteristics that is used to correct gradation of the image are evaluated based upon the histogram of the image created in the histogram creation step and the gradation correction characteristics;
   wherein the gradation correction characteristics are evaluated in the evaluation step based upon a ratio of a change in output characteristics to a change in individual gradation levels observed in the gradation correction characteristics and frequency values of the individual gradation levels indicated in the histogram.

8. A gradation correction characteristics evaluation method according to claim 7, wherein:
   a plurality of sets of gradation correction characteristics different from one another are individually evaluated in the evaluation step.

9. A gradation correction characteristics evaluation method according to claim 7, wherein:
   a normalized histogram is created in the histogram creation step by applying a predetermined weighting coefficient to the histogram having been created based upon the pixel values indicated at the pixels constituting the image; and
   the gradation correction characteristics are evaluated in the evaluation step based upon the normalized histogram and the gradation correction characteristics.

10. A gradation correction characteristics evaluation method according to claim 7, further comprising:
    a dividing step in which the image is divided into a plurality of areas, wherein:
    a histogram for each area is created in the histogram creation step based upon pixel values indicated at pixels constituting an image in the area;
    gradation correction characteristics are obtained in correspondence to the image in each area in a gradation correction characteristics acquisition step; and
    the gradation correction characteristics for each area are evaluated based upon the histogram of the image in the area and the gradation correction characteristics that is used to correct gradation in the image in the area.

11. A gradation correction characteristics evaluation method according to claim 7, further comprising:

a face area detection step in which an area occupied by a person's face in the image is detected, wherein:

the histogram of the image is created in the histogram creation step by increasing weighting applied to the area occupied by the person's face detected through the face area detection step.

12. An image processing method, comprising:

steps of a gradation correction characteristics evaluation method according to claim 7; and a processing step in which gradation correction is executed by using the gradation correction characteristics selected based upon evaluation results obtained through the evaluation step.

13. A non-transitory computer-readable computer program product containing a gradation correction characteristics evaluation program that comprises instructions to execute steps of a gradation correction characteristics evaluation method according to claim 7.

14. A non-transitory computer-readable computer program product containing an image processing program that comprises instructions to execute steps of an image processing method according to claim 12.

* * * * *